Patented Jan. 25, 1944

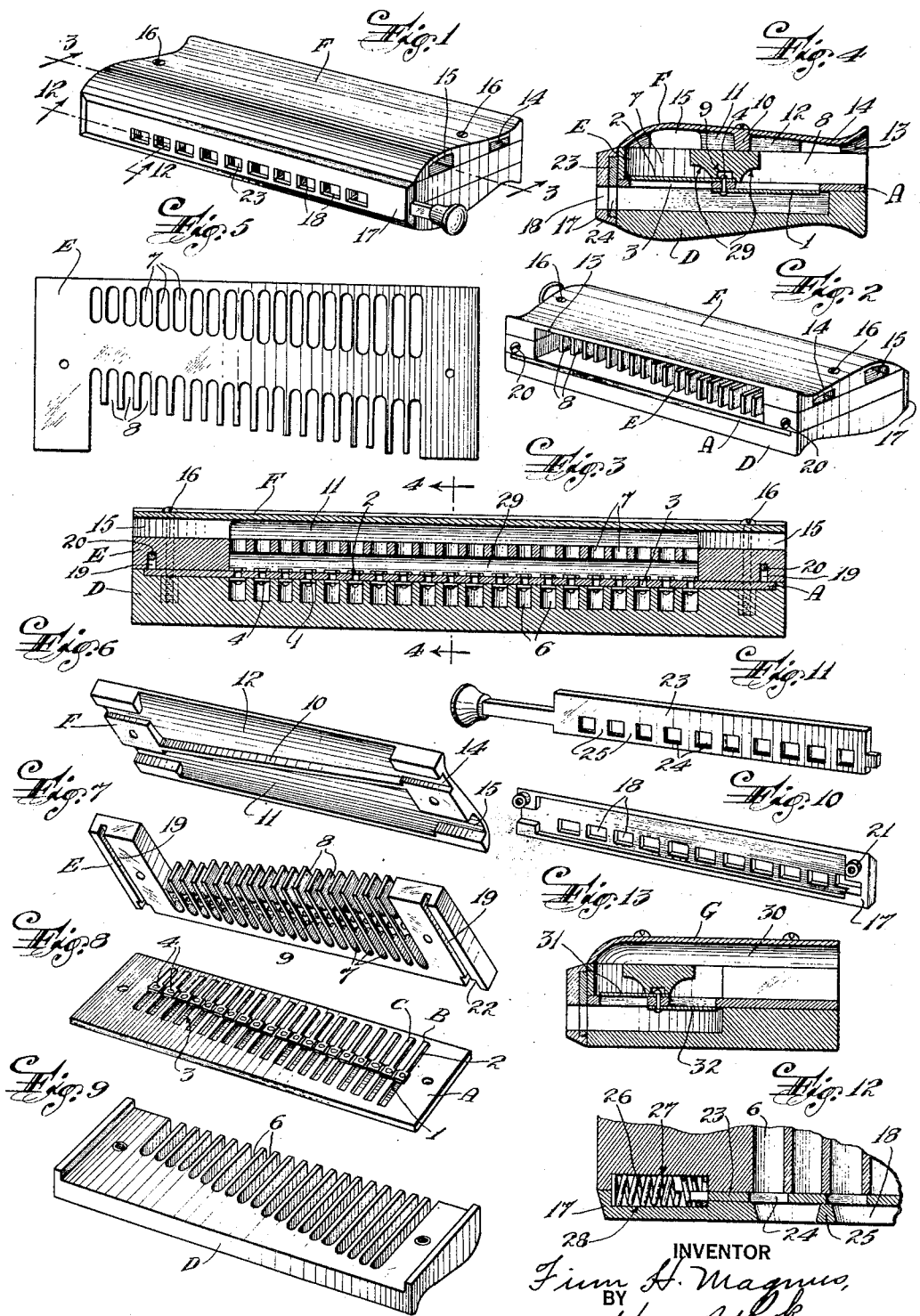

2,339,790

UNITED STATES PATENT OFFICE 2,339,790

HARMONICA

Finn H. Magnus, West Caldwell, N. J.

Application August 26, 1942, Serial No. 456,130

16 Claims. (Cl. 84—377)

This invention relates to harmonics in general, but in its more specific aspects the invention is directed to harmonicas by which a chromatic scale may be played such as described in my copending application Serial No. 448,339, filed June 25, 1942.

As pointed out in that application, it is the general practice to arrange each "blow" or "exhale" reed and the corresponding "draw" or "inhale" reed in side-by-side relation at opposite sides of the reed plate to communicate with the same wind cell. Also the wind or air currents leaving all of the "blow" reeds pass directly into a sound chamber, while the wind or air currents entering all of the "draw" reeds pass directly from said sound chamber. In other words, the reed plate and reeds form one side of a sound chamber that is common to all of the reeds. This arrangement requires each wind cell to be of a width greater than the aggregate of the widths of two reeds, which limits the number of reeds that can be arranged on a plate without causing the instrument to be excessively long. Further, the velocity of the wind or air currents passing the reeds and through the wind cells is low, which requires relatively hard exhaling or inhaling, and the intensity of the sound is small due to the passage of the sound waves directly from the reeds to the large, common sound chamber.

Instead of the aforesaid side-by-side arrangement of the reeds, it is proposed in my said copending application to arrange the reeds of each pair; i. e., each blow reed and the corresponding draw reed, in longitudinal alignment with each other or in end-to-end relation and with their adjacent ends in overlapping relation to each other. Each reed is to be located over its own slot as usual with the "blow" reed at one side and the "draw" reed at the other side of the reed plate; and the adjacent ends of the reeds of each pair are to be secured to the reed plate by the same rivet.

In my aforesaid application it is also proposed that a separate wind cell and a separate sound cell shall be provided for each pair of reeds, but with that arrangement air currents for vibrating either reed of a pair may leak through the slot of the other reed so that the volume of sound produced through vibration of the reeds by the velocity and pressure of said air currents may be less than is desired for some purposes.

Therefore, prime objects of my present invention are to provide in a harmonica a novel and improved construction and arrangement of wind cells, reeds and sound cells, whereby leakage or escape of air currents around one of a pair of reeds during vibration of the other reed of said pair shall be reduced to the minimum; thus to provide a common wind cell and separate sound cells for the reeds of each pair.

Another object is to provide a common sound chamber for the "blow" reeds of all pairs and a common sound chamber for all of the "draw" reeds, said sound chambers communicating respectively with the sound cells of the "blow" reeds and the sound cells of the "draw" reeds, whereby the air currents shall be caused to flow through the reed slots at high pressure and velocity to vibrate the reeds so as to produce sounds of high intensity and the large sound chambers shall ensure sounds of large volume and good tonal quality.

Other objects, advantages and results of the invention will be brought out by the following description in conjunction with the accompanying drawing in which:

Figure 1 is a perspective view of a harmonica embodying my invention viewing the same from the front or mouth piece.

Figure 2 is a similar view of the harmonica from the rear.

Figure 3 is an enlarged vertical longitudinal sectional view on the line 3—3 of Figure 1.

Figure 4 is a transverse vertical sectional view on the line 4—4 of Figure 3.

Figure 5 is a top plan view of the sound cell block.

Figure 6 is a perspective view of the top casing plate or body section of the harmonica.

Figure 7 is a bottom perspective view of the sound cell block.

Figure 8 is a perspective view of the reed plate with the reeds assembled thereon.

Figure 9 is a similar view of the bottom casing plate or body section.

Figure 10 is a rear perspective view of the mouth piece detached from the harmonica.

Figure 11 is a detached perspective view of the valve slide.

Figure 12 is an enlarged fragmentary horizontal sectional view on the line 12—12 of Figure 1.

Figure 13 is a view similar to Figure 4 showing a modification of the invention.

Specifically describing the embodiment of the invention illustrated in Figures 1 to 12 inclusive the harmonica includes a reed plate A on which are mounted a plurality of pairs of reeds, each pair comprising a "blow" or exhale reed 1 and a "draw" or inhale reed 2. Preferably alternate pairs of the reeds are tuned to different scales, for example the pairs B being tuned to full or natural notes and the pairs C being tuned to half tones, i. e., sharps or flats. As shown, the pairs of reeds correspond in number and are tuned to the twenty notes of the complete chromatic scale, there being twenty pairs of reeds each tuned to one note.

Generally the reeds of a pair in a harmonica are arranged in side by side relation to each other, but in accordance with my invention the reeds and 2 of each pair are arranged in longitudinal alignment with each other or in end-to-end relation with their adjacent ends in overlapping relation to one another. The reed plate has the usual slots 3 over which the respective reeds are mounted, and the "draw" reed is mounted at one side of the plate while the "blow" reed is mounted at the other side, both reeds of a pair being secured on the reed plate by the same fastening means such as a rivet 4. This arrangement permits the use of a maximum number of reeds within in a given length of reed plate.

The reed plate is secured between a bottom casing section or wind cell block D and a sound cell block E upon which is secured the top casing section or sound chamber plate F. The bottom section D has a plurality of grooves 6, one for each pair of reeds. These grooves serve as wind cells and each is preferably of a width slightly greater than the widths of the corresponding reeds and of a length slightly greater than the aggregate of the lengths of the reeds of the pair. The grooves 6 open through the front edge of the section as shown in Figures 4 and 9. The sound cell block E has a transverse slot 7 for each of the "draw" reeds 2 and a slot 8 for each of the "blow" reeds 1. Each of the slots 7 and 8 is preferably of a width slightly greater than the widths of the corresponding reeds and of a length slightly greater than the aggregate of the lengths of the reeds of the pair, and the slots 8 open through the rear edge of the block as shown in Figures 2, 4, 5 and 7. The under side of the cell block has a plurality of recesses 9 between the slots 7 and 8 for each pair of reeds to provide clearances for the riveted ends of the "draw" reeds 2, so that the sound cell block E may fit snugly against the top side of the reed plate. While all of the grooves 6 and all of the slots 7 and 8 properly can be called "wind cells," to avoid circumlocution hereafter, the slots 7 and 8 will be denoted: sound cells.

The top casing section or sound chamber plate F is divided longitudinally by a partition 10 on its under side to form two chambers 11 and 12 that serve as sound chambers for all of the "draw" reeds and all of the "blow" reeds, respectively, the partition 10 abutting tightly against the top of the cell block E along the zone between the slots 7 and 8. The chamber 12 is open at the rear longitudinal edge as indicated at 13 and also has two end openings 14, while the chamber 11 is provided with openings only at its ends as indicated at 15.

The casing sections D and F, the reed plate A, and the sound cell block E may be secured together in superposed relation in any suitable manner as by screws 16.

At the front of the body or casing of the harmonica is secured a mouthpiece 17 that has a plurality of openings 18, each to register with two adjacent wind cells or grooves 6 as shown in Figure 12. The mouthpiece may be secured to the casing in any suitable way, but as shown the under-side of the sound cell block E has a groove 19 at each end opening through the front and rear edges thereof and in which lies a screw rod 20 which passes through the sound cell block and into a screw-threaded boss 21 on the rear side of the mouthpiece 17. The front edge of the block E has recesses 22 to receive the bosses 21 of the mouthpiece plate.

A valve slide 23 is mounted at the rear of the mouthpiece plate to control communication between the mouthpiece openings 18 and the wind cells 6. As shown, this valve slide has openings 24 spaced by solid portions 25 so that when the slide is in one position the openings 24 will register with the respective wind cells 6 for the pairs of reeds tuned to one scale, for example, the natural tones, in which position the portions 25 of the slide will prevent communication between the mouthpiece openings 18 and the wind cells for the pairs of reeds tuned to the other scale. In its other position, the openings 24 of the slide will permit communication between the mouthpiece openings and the wind cells for the last-mentioned or half-tone reeds, while the portions 25 will at the same time prevent communication between the mouthpiece openings 18 and the wind cells for the pairs of reeds tuned to the other scale.

A compression spring 26 is arranged in complemental recesses 27 and 28 in the bottom casing section D and the mouthpiece plate and abuts one end of the valve slide as shown in Figure 12 so as to normally hold the slide in a position to permit communication between the mouthpiece openings and the cells for the pairs of reeds tuned to one scale.

It will thus be seen that there is a separate wind cell 6 for each pair of reeds at one side of the reed plate, and that there is a separate sound cell 7 for each "draw" reed and a separate sound cell 8 for each "blow" reed at the other side of the reed plate. Accordingly, in the operation of the instrument the air currents for vibrating the "draw" reeds 2 will be drawn through the openings 15 of the sound chamber plate F through the individual sound cells 8 and the individual reed slots 3, and there is no possibility of leakage or escape of these air currents through the slots of the "blow" reeds 1. The air currents for vibrating the "blow" reeds 1 pass inwardly through the wind cells 6 through the reed slots for the respective "blow reeds" and through the respective sound cells 8 into the sound chamber 12, escaping from that chamber through the end openings 14 and the rear opening 13. Due to the separate sound chamber 11 for the "draw" reeds, any tendency of the air currents for operating the "blow" reeds to pass through the slots of the "draw" reeds is restricted by the building up of air pressure in the sound chamber 11, the only outlet for which is the opening 15.

Consequently, air currents will flow past the "draw" reeds and the "blow" reeds at high pressure and velocity with a minimum of exertion during inhalation and exhalation so as to produce sound of high intensity; and the large sound chambers 11 and 12, common to all of the "draw" reeds and all of the "blow" reeds respectively, ensure large volume and good tonal quality of the sound.

It may be desirable in some instances to further increase the velocity and pressure of air currents immediately adjacent the zone of their passage through the reed slots, and for this purpose the sound cell block E may have ledges 29 overhanging the reed slots in close proximity to the reed plate.

While the end openings 14 of the sound chamber 12 might be omitted, they are preferred in order to prevent excessive muffling of the sound when the hands of the player are held over the main opening 13 for the purpose of producing special tonal effects.

I prefer to use separate sound chambers for the "draw" reeds and the "blow" reeds, but it is possible to utilize the same sound chamber for all of the "draw" reeds and all of the "blow" reeds as shown in Figure 13. This figure illustrates a harmonica which is in general the same as that hereinbefore described but which includes a sound chamber plate G from which the partition 10 has been omitted so as to provide a common sound chamber 30 for all of the "draw" reeds 31 and all of the "blow" reeds 32. It will be observed that this form of the invention is devoid of the advantages of the structure shown in Figures 1 to 9 inclusive in respect to the prevention of escape of air currents around one of the reeds of a pair, while the other reed of said pair is being vibrated.

While I have shown and described two embodiments of my invention, it will be understood that many modifications and changes may be made in the details of structure of the harmonica without departing from the spirit and scope of the invention.

What I claim is:

1. A harmonica comprising a reed plate, a plurality of pairs of reeds mounted on said plate, each pair comprising a "blow" reed and a "draw" reed, and a body having at one side of said reed plate a separate sound cell for each reed and at the other side of said reed plate a separate wind cell for each pair of reeds.

2. A harmonica comprising a reed plate, a plurality of pairs of reeds mounted on said plate, each pair comprising a "blow" reed and a "draw" reed arranged in longitudinal alignment with each other, and a body having a sound cell for each "draw" reed and a sound cell for each "blow" reed at one side of said reed plate, said body also having at the other side of said reed plate a wind cell for each pair of reeds.

3. The harmonica set forth in claim 1 wherein said body also has a sound chamber common to and communicating with all of said sound cells for said "draw" reeds, and another sound chamber common to and communicating with all of said "blow" reed sound cells.

4. The harmonica set forth in claim 2 wherein said body also has a sound chamber common to and communicating with all of said sound cells for said "draw" reeds, and another sound chamber common to and communicating with all of said "blow" reed sound cells.

5. A harmonica comprising a reed plate, a plurality of pairs of reeds mounted on said plate, each pair comprising a "blow" reed and a "draw" reed, and a body having wind cells for said reeds and also having a separate sound cell for each reed.

6. The harmonica set forth in claim 1 wherein said sound cells are of a width only slightly greater than the width of the corresponding reeds.

7. The harmonica set forth in claim 2 wherein said cells are of a width only slightly greater than the width of the corresponding reeds and of a length only slightly greater than the aggregate of the lengths of the reeds of a pair.

8. The harmonica set forth in claim 2 wherein said body has a mouthpiece provided with openings to communicate with said wind cells, and said "draw" reeds are located adjacent the respective openings of said mouthpiece.

9. The harmonica set forth in claim 2 wherein said body also has a sound chamber common to and communicating with all of said sound cells for said "draw" reeds, and another sound chamber common to and communicating with all of said "blow" reeds, and wherein said body has a mouthpiece provided with openings each to communicate with one of said wind cells, and said "draw" reeds are located adjacent the respective openings of said mouthpiece.

10. A harmonica comprising a reed plate, a plurality of pairs of reeds on said reed plate in side-by-side relation to each other, each pair comprising a "blow" reed and a "draw" reed arranged in longitudinal alignment with each other, a body section secured to one side of said reed plate and having wind cells for said reeds that open through one edge of said section to form a mouthpiece, a sound cell block secured upon the other side of said reed plate and having a sound cell for each reed, and a body section secured upon said sound cell block and divided into two separate non-communicating sound chambers along the zone between said sound cells for the "draw" reeds and said sound cells for the "blow" reeds so as to provide one sound chamber for all "draw" reeds and another sound chamber for all "blow" reeds, each sound chamber having an outlet separate from and non-communicating with the outlet of the other sound chamber.

11. The harmonica set forth in claim 10 wherein each of said wind cells and said sound cells is of a width only slightly greater than the width of the corresponding reeds and of a length only slightly greater than the aggregate of the lengths of the reeds of a pair.

12. A harmonica comprising a reed plate, a plurality of reeds mounted on said reed plate, a body section secured to one side of said reed plate and having wind cells for said reeds, and a sound cell block secured upon the other side of said reed plate and having a slot therethrough for each reed and a ledge at one end of said slot overhanging the reed in proximity to the reed plate, whereby said slots serve as sound cells for said reeds.

13. The harmonica set forth in claim 10 wherein each sound cell consists of a slot through said sound cell block, which has a ledge at one end overhanging the corresponding reed in proximity to the reed plate.

14. The harmonica set forth in claim 5 wherein said body also has a sound chamber common to and communicating with all of said sound cells for said "draw" reeds and another sound chamber common to and communicating with all of said "blow" reed sound cells.

15. A harmonica comprising a reed plate, a plurality of reeds mounted on said reed plate, a body section secured to one side of said reed plate and having wind cells for said reeds, and a sound cell block secured upon the other side of said reed plate and having a slot therethrough for each reed, whereby said slots serve as sound cells for said reeds.

16. The harmonica set forth in claim 15 with the addition of a body section secured upon said sound cell block and having one sound chamber communicating with a certain number of said sound cell slots and another sound chamber communicating with the remainder of said sound cell slots.

FINN H. MAGNUS.